(12) United States Patent
Gutowski et al.

(10) Patent No.: US 9,325,737 B2
(45) Date of Patent: Apr. 26, 2016

(54) SECURITY BASED NETWORK ACCESS SELECTION

(75) Inventors: Gerald J. Gutowski, Glenview, IL (US); Stanley J. Benes, Round Lake Beach, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 2003 days.

(21) Appl. No.: 11/769,814

(22) Filed: Jun. 28, 2007

(65) Prior Publication Data

US 2009/0007246 A1    Jan. 1, 2009

(51) Int. Cl.
*H04L 29/00* (2006.01)
*H04L 29/06* (2006.01)

(52) U.S. Cl.
CPC ....................................... *H04L 63/20* (2013.01)

(58) Field of Classification Search
USPC .......................................... 455/8, 518; 726/6
See application file for complete search history.

(56) References Cited

U.S. PATENT DOCUMENTS

| | | | |
|---|---|---|---|
| 5,758,291 A * | 5/1998 | Grube et al. ................... | 455/518 |
| 6,298,233 B1 | 10/2001 | Souissi et al. | |
| 6,775,285 B1 * | 8/2004 | Moles et al. ................... | 370/392 |
| 7,143,171 B2 | 11/2006 | Eriksson et al. | |
| 7,171,157 B2 * | 1/2007 | Lee .................................... | 455/8 |
| 7,737,896 B1 | 6/2010 | Suri et al. | |
| 8,010,801 B2 * | 8/2011 | Qi et al. ......................... | 713/189 |
| 2005/0059392 A1 | 3/2005 | Lankford | |
| 2005/0066033 A1 | 3/2005 | Cheston et al. | |
| 2005/0198247 A1 | 9/2005 | Perry et al. | |
| 2006/0090198 A1 | 4/2006 | Aaron | |
| 2006/0092890 A1 | 5/2006 | Gupta et al. | |
| 2006/0258350 A1 | 11/2006 | Roy et al. | |
| 2007/0032235 A1 | 2/2007 | Wahl et al. | |
| 2009/0005041 A1 | 1/2009 | Steinberg et al. | |

FOREIGN PATENT DOCUMENTS

EP    1569393 B1    1/2007

OTHER PUBLICATIONS

Foundry Hammers Security Into Switches, ZDNet.co.uk, http://wwww.zdnet.co.uk/misc/print/0,10000000169,39284293-39001101c,00.htm, Jun. 26, 2007, pp. 1-2.

(Continued)

*Primary Examiner* — Brandon Hoffman
*Assistant Examiner* — Michael D Anderson (57) ABSTRACT

A method and wireless device select a set of secure network connections (230) between a wireless device (108) in a wireless communication system and a target destination system (238). A first security assessment (708) associated with each of a plurality of base station connections associated with respective each of a plurality of base stations (116) available for wireless communications with the wireless device (108) is performed. A second security assessment (716) associated with each of a plurality of subsequent network connections available between the plurality of base stations (116) and a target destination system (238) is performed. A set of base station connections from the plurality of base station connections are prioritized according to predetermined security criteria associated with the wireless device (108). A set of subsequent network connections from the plurality of subsequent network connections (230) are prioritized according to predetermined security criteria associated with the wireless device (108).

18 Claims, 8 Drawing Sheets

(56) References Cited

OTHER PUBLICATIONS

Intosai, Information System Security Review Methodology, A Guide for Reviewing Information System Security in Government Organisations, Issued by EDP Audit Committee International Organisation of Supreme Audit Institutions Oct. 1995, p. 35.

Ghazizadeh, S et al.: "Security-aware adaptive dynamic source routing protocol", Proceedings of the 27th Annual IEEE Conference on Local Computer Networks (LCN), Nov. 6, 2002, pp. 751-760.

Fang, Y. et al.: "Security Analysis and Enhancements of 3GPP Authentication and Key Agreement Protocol", IEEE Transactions on Wireless Communications, vol. 4, No. 2, Mar. 1, 2005, pp. 734-742.

PCT Search Report Dated Aug. 4, 2009.

Final Office Action mailed Mar. 29, 2011 in related U.S. Appl. No. 11/769,795, Paul D. Steinberg, filed Jun. 28, 2007.

Final Office Action mailed May 4, 2012 in related U.S. Appl. No. 11/769,795, Paul D. Steinberg, filed Jun. 28, 2007.

Non Final Office Action mailed Oct. 1, 2010 in related U.S. Appl. No. 11/769,795, Paul D. Steinberg, filed Jun. 28, 2007.

Non Final Office Action mailed Dec. 30, 2011 in related U.S. Appl. No. 11/769,795, Paul D. Steinberg, filed Jun. 28, 2007.

Qualys, Inc., "On Demand Security, Compliance Overview, Organizational Policy & Regulatory Compliance—Qualys," qualys.com, Downloaded from http://www.qualys.com/solutions/policy_compliance/, on Jun. 27, 2007, pp. 1-2.

Airwave Wireless, "Airwave Management Platform (AMP), Airwave-Wireless Network Management Software-Products: AMP," AirWave Wireless, a Division of Aruba Company, downloaded from http://www.airwave.com/products/AMP.html on Jun. 26, 2007, pp. 1-3.

International Preliminary Report on Patentability and Written Opinion for counterpart International Patent Application No. PCT/US2008/067580 issued Jun. 25, 2013.

Corresponding Chinese Applciation No. 200880022304.0—Office Action issued Aug. 1, 2013 with English Translation.

* cited by examiner

SECURITY BASED NETWORK ACCESS SELECTION

REFERENCE(S) TO RELATED APPLICATION(S)

This application is related to a co-pending application entitled "DYNAMIC NETWORK SELECTION BY A WIRELESS DEVICE USING POLICIES," filed on even date herewith, assigned to the assignee of the present application, and hereby incorporated by reference.

FIELD OF THE INVENTION

The present invention generally relates to the field of wireless communications, and more particularly relates to the dynamic selection of a network by a wireless device based on security provided by the network.

BACKGROUND OF THE INVENTION

Wireless communication systems have evolved greatly over the past few years. Current wireless communication systems provide multiple services such as cellular services, data services, and the like. These services can be provided by various access networks within a wireless communication system. Therefore, a wireless device may detect numerous networks that it can connect with. One problem with current wireless systems is that an efficient method for a wireless device to select a network from multiple networks based on confidence of security offered does not exist. Each network that a wireless device detects can offer different security levels. Current wireless communication systems do not provide a reliable method for a wireless device to select a network based on the different security levels offered by networks.

Therefore a need exists to overcome the problems with the prior art as discussed above.

SUMMARY OF THE INVENTION

Briefly, in accordance with the present invention, disclosed are a method and wireless device for selecting a set of secure network connections between a wireless device in a wireless communication system and a target destination system. The method includes performing a first security assessment. The first security assessment is associated with each of a plurality of base station connections associated with respective each of a plurality of base stations available for wireless communications with the wireless device. A second security assessment associated with each of a plurality of subsequent network connections available between the plurality of base stations and a target destination system is performed. A set of base station connections from the plurality of base station connections and a set of subsequent network connections from the plurality of subsequent network connections are prioritized according to predetermined security criteria associated with the wireless device. The prioritizing is performed in response to performing the first security assessment and the second security assessment.

In another embodiment, a method with an information processing system for assessing security provided by a plurality of networks is disclosed. The method includes receiving a request from a wireless device for security information associated with at least one of a plurality of base stations and a plurality of subsequent network connections available between the plurality of base stations and a target destination system. A first security assessment associated with each of a plurality of base station connections associated with respective each of the plurality of base stations is performed in response to receiving the request. A second security assessment associated with each of the plurality of subsequent network connections is performed. Each subsequent network connection in the plurality of subsequent network connections comprises a plurality of network components for allowing communication with the at least one target destination system.

In yet another embodiment, a wireless device is disclosed. The wireless device includes a memory and a processor that is communicatively coupled to the memory. A transceiver is communicatively coupled to the memory and the processor. A security monitor service manager is also communicatively coupled to the memory and the processor. The security service monitor manager is adapted to determine at least one security requirement for at least one network connection for communicating to a target destination system. A first security assessment associated with each of a plurality of base station connections associated with respective each of a plurality of base stations is analyzed. A base station is dynamically selected from the plurality of base stations that satisfies the at least one security requirement in response to analyzing the first security assessment.

An advantage of the foregoing embodiments of the present invention is that a two-tiered security assessment process is provided for network and network pathway selection. For example, a wireless device or information processing system can implement a two-tiered security assessment process that assesses security at a cell/network level and at a network pathway level.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, wireless interface card, and the like.

Wireless Communications System

Figure 1:
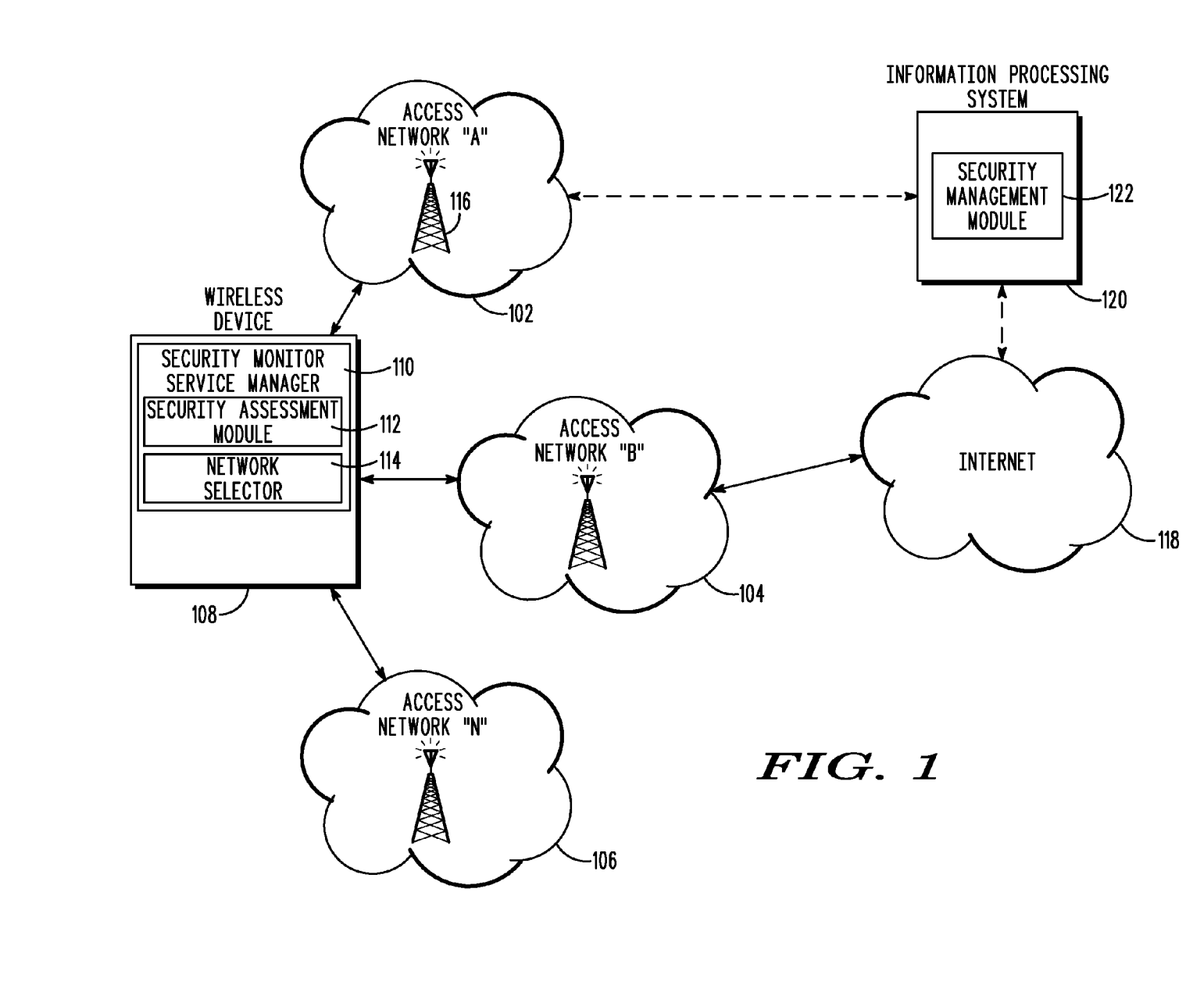
FIG. 1 is a block diagram illustrating a high level overview of a wireless communication system according to an embodiment of the present invention.

According to an embodiment of the present invention, as shown in FIG. 1, a wireless communications system 100 is illustrated. FIG. 1 shows the wireless communications system 100 comprising a plurality of access networks 102, 104, 106. The access networks 102, 104, 106, in one embodiment, can comprise one or more circuit services networks and/or data packet networks. Further, the communications standard of the access networks 102, 104, 106 comprises Code Division Multiple Access (CDMA), Time Division Multiple Access (TDMA), Global System for Mobile Communications (GSM), General Packet Radio Service (GPRS), Frequency Division Multiple Access (FDMA), IEEE 802.16 family of standards, Orthogonal Frequency Division Multiplexing (OFDM), Orthogonal Frequency Division Multiple Access (OFDMA), Wireless LAN (WLAN), WiMAX or the like. Other applicable communications standards include those used for Public Safety Communication Networks including TErrestrial TRunked Radio (TETRA).

Each access network 102, 104, 106 can be owned and operated by separate wireless service providers. Alternatively, two or more of the access networks 102, 104, 106 can be owned and operated by the same wireless service provider. For example, a single wireless provider can own Access Network A 102, which can be a WiMax system, and can also own Access Network B 104, which can be a cellular system.

The wireless communications system 100 supports any number of wireless devices 108 which can be single mode or multi-mode devices. Multi-mode devices are capable of communicating over multiple access networks with varying technologies. For example, a multi-mode device can communicate over a circuit services network and a packet data that can comprise an Evolution Data Only ("EV-DO") network, a General Packet Radio Service ("GPRS") network, a Universal Mobile Telecommunications System ("UMTS") network, an 802.11 network, an 802.16 (WiMax) network, or the like. The wireless device 108, in one embodiment, connects to a public network 118 such as the Internet through the access networks 102, 104, 106.

In one embodiment, the wireless device 108 includes security monitor service manager 110 that includes a security assessment module 112, and a network selector 114. The service manager 110, security assessment module 112, and network selector 114 are discussed in greater detail below. The wireless system 100 also includes one or more base stations 116 that reside within each access network 102, 104, 106. It should be noted that access networks 102, 104, 106 also include additional components (not shown) such as controllers, transport/interconnect gear, network management modules, and the like that should be known to those of ordinary skill in the art.

One or more information processing systems 120 communicate with the wireless device 108. The information processing system 120 can reside outside of the wireless communication system 100 and communicates with the wireless device 108 via a public network 118 such as the Internet. In another embodiment, the information processing system 120 resides within the wireless communication system 104 and is part of a service provider's network. In one embodiment, the information processing system 120 includes a security management module 122, which is discussed in greater detail below.

Device Based Network Security Assessment

Figure 2:
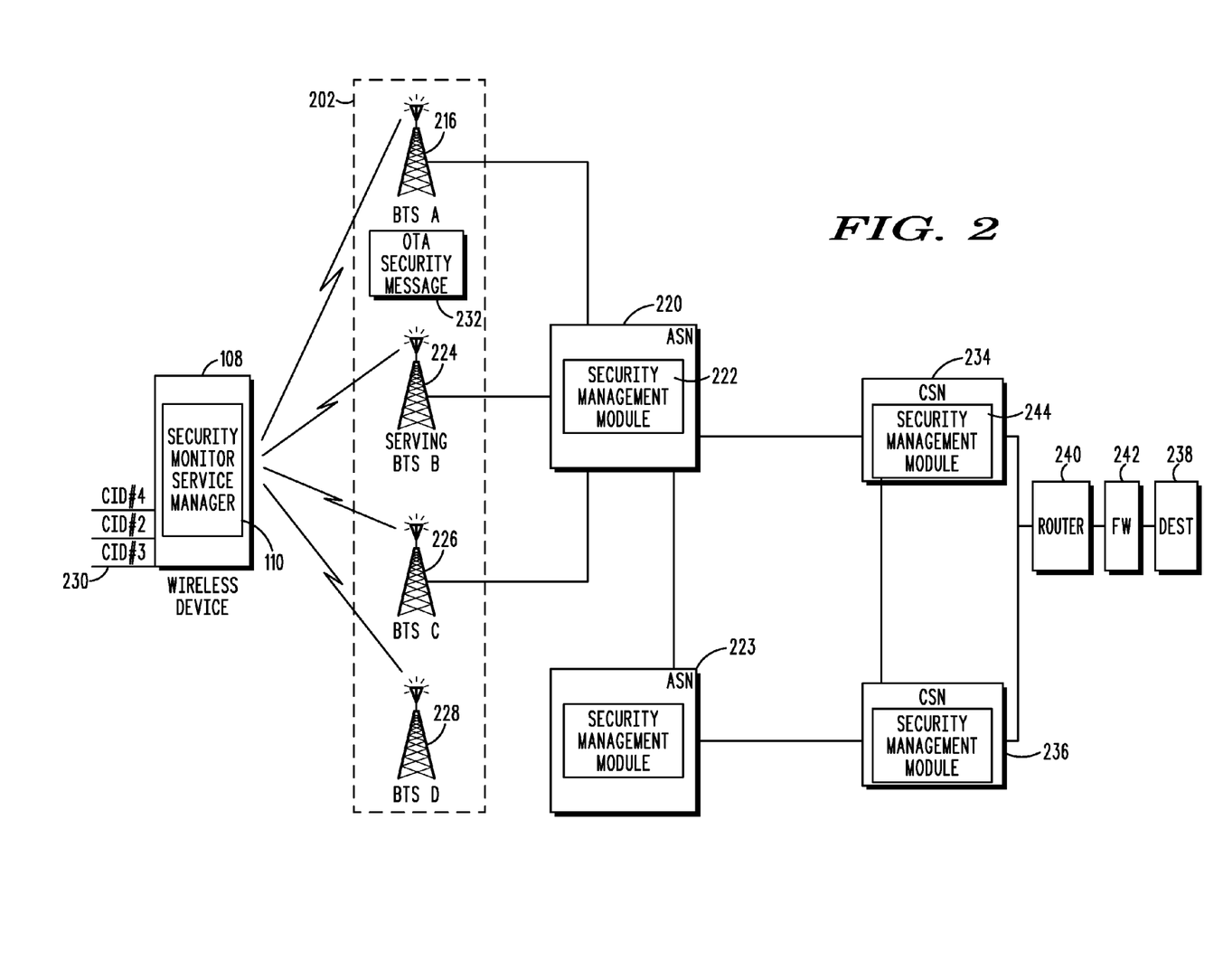
FIG. 2 is a block diagram illustrating a wireless communication system comprising a wireless device that performs a two-tiered network security assessment process according to an embodiment of the present invention.

One advantage of various embodiments of the present invention is that a two-tiered security assessment process is provided for network selection and network pathways of reaching a final destination. For example, FIG. 2 shows an example where a wireless device 108 implements a two-tiered security assessment process for selecting a network or a cell and negotiating a network pathway to reach a destination. FIG. 2 shows the wireless communication system 100 comprising the wireless device 108 and a plurality of base stations 216, 224, 226, 228. It should be noted that each base station 216, 224, 226, 228 can represent a separate access network, separate cells within the same access network, or a combination of both.

For example, in one embodiment, base station A 216 can represent a first access network, base station B 224 can represent a second access network, base station C 226 can represent a third network, and base station D 228 can represent a fourth access network. These access networks can all be of the same air interface type or different air interface types. In another example, base station A 216 and base station B 224 can represent different cells within a first access network while base station C 226 and base station D 228 can represent different cells in a second access network. Alternatively, each base station 216, 224, 226, 228 can represent a different cell within a single access network and be of the same air interface type. However, each cell may be offer a different level of security. This example is used throughout the discussion of FIG. 2. It should be noted that from each base station 216, 224, 226, 228 may be referred to as cell/network throughout this discussion.

In the example of FIG. 2, each the wireless device 108 is active in an access network 202 providing WiMax services. For example, the wireless device 108 is communicating with base station B 224. The wireless device 108 detects a plurality of base stations 216, 224, 226, 228 each residing in a different cell of the WiMax access network 202. Each base cell/network 216, 224, 226, 228, in the example, provides a different security level. For example, cell A 216 may provide 256-bit encryption and/or a no encryption state, cell B 224 (the serving cell of the wireless device 108 in this example) may provide free access (no-encryption), cell C 226 may provide 128-bit encryption, and cell D 228 may provide 64-bit encryption.

The wireless device 108 can comprise various connection IDs 230 that require different security needs. In IEEE-based communication systems, the CID (Connection ID) (or list of CIDs, multi-session applications running to the device, and the like) exists for the device in a connection oriented fashion. A CID is direction specific (e.g., downlink and uplink) and is only valid for a specific connection instance for at least one application on the device 108 in the 802.16 MAC (medium access control) layer in which every MAC packet needs to have a CID. For example, in WiMAX, a wireless device 108 is most likely to be active in a data transfer state when a primary management connection is set up for the device 108 by the base station 216, 224, 226, 228. The WiMAX base stations 216, 224, 226, 228 typically reserve several CIDs for each device's 108 (basic, primary and secondary management) potential connections.

Therefore, in one embodiment, the security monitor service manager 110 of the wireless device 108 determines a quality of security service ("QoSS") or security level required by the device 108 to perform an action or use a service. Each base station 216, 224, 226, 228 transmits an over-the-air ("OTA") message 232 including security information for its respective network cell. The wireless device 108 receives the OTA security message 232, which is analyzed by the security assessment module 112.

The security assessment module 112 ranks each of the cells/networks based on the associated security level. In other words, cells/networks with a higher level of security are ranked higher than cells/networks with a lower level of security. For example, the following is an exemplary security ranking for various of security with 1 being the lowest ranking and 9 being the highest ranking: 1.) no encryption, 2.) authentication, 3.) low bit periodic encrypt, 4.) low bit periodic encrypt with authentication, 5.) low bit full encrypt, 6.) low bit full encrypt with authentication, 7.) high bit periodic encrypt with authentication, 8.) high bit full encrypt with authentication, 9.) high bit full encrypt with repeat authentication.

Therefore, in the example of FIG. 2, the security assessment module 110 ranks the cells/networks as follows: 1.) cell B 224 (free access), 2.) cell D 228 (64-bit encryption), 3.) cell C 226 (128-bit encryption), and 4.) cell A 216 (256-bit encryption). The security assessment module 110 can also rank the cells/networks based on how close an associated security level matches the requirements of the wireless device 108. In one embodiment, a list of candidate cells/networks is generated based on the security assessment of each cell/network. The network selector 114 dynamically selects a cell/network from the detected cells/network based on the required QoSS or security requirements of the wireless device 108. The network selector 114, in one embodiment, selects the cell/network based on its ranking. If a cell/network cannot provide a security level required by the wireless device 108, the device can remain associated with its serving cell/network or select "next best" cell/network.

Once the cell/network is selected, the wireless device 108 transitions to the new cell/network (if needed) and performs a second-tier security assessment of the various network paths existing between the device 108 and a final destination 238. For example, various network components such as gateways, routers, firewalls, and the like can exist between the wireless device 108 and the destination to receive data from the wireless device 108. FIG. 2 shows one or more Access Service Network ("ASN") gateways 220, 232 communicatively coupled each to each cell/network 216, 224, 226, 228. One or more Core Service Networks ("CSN") gateways 234, 236 are communicatively coupled to the ASNs 220, 232.

A WiMAX network architecture has two key features: the ASN Gateway and the CSN. In the WiMAX architecture, the ASN Gateway typically resides at the Operator's premise and connects to multiple WiMAX Base Stations and similar in functionality to 3G BSCs handling mobility handover management, varying levels of resource management and acts as a proxy for authentication and network mobility messages destined for the CSN. The CSN provides authentication, inter-network mobility, IP address management, and other billing and service provider related functionality.

The wireless device 108 queries various network paths from its current cell to a final destination 238 to receive data from the device 108. For example, the wireless device 108 queries a path through the ASN 220, CSN 234, router 240, firewall 242. In one embodiment, the wireless device 108 utilizes a connection ID 230 reserved for assessing the security of a network path. The security management module 222 of the ASN 220 returns security information associated with itself. The CSN 234 also comprises a security management module 244 that returns security information associated with the CSN 234 to the wireless device 108. For example, the CSN may return security information that indicates that this particular CSN 234 provides security services such as IPSEC VPN, Radius/Authentication, Wireless Transport Security, Transport Layer Security, and SSL/VPN. The wireless device 108 also determines the security level offered by other network components such as routers 240 and firewalls 242. For example, the security assessment module 112 determines if each of these components 240, 242 provides auditing, integrity checks, intrusion detection, non-repudiation, and the like.

The security assessment module 114 analyzes all of the security information received from each component on all queried network paths. The security assessment module 114 can then determine whether any network path provides a security level that meets or exceeds the security requirements of the wireless device 108. It should be noted that the wireless device 108 can have a different security requirement for the first-tier (i.e., cells/networks) than for the second-tier (i.e., network paths to the destination 238) of the security assessment process.

If one or more of the network paths can provide the wireless device 108 with the appropriate level of security, the security monitor service manager 110 selects one of these network paths to communicate over. However, if none of the network paths can provide the wireless device 108 with the appropriate level of security, the wireless device 108 terminates its connection with its current cell/network and removes this cell/network from it list of candidate cell/networks. The wireless device 108 then selects another cell/network from security level ranking list.

As can be seen from the above discussion, various embodiments of the present invention provide an advantageous security assessment procedure. A wireless device 108 can utilize OTA security messages received from nearby cells/networks and rank each cell/network according to its security level and/or how closely the security level matches to a security requirement of the wireless device 108. Once the wireless device 108 dynamically selects a cell/network to communicate over, the device 108 then performs a second-tier security assessment of the various network paths between the cell/ network and a destination. The wireless device 108 is able to analyze the security information received from each network component on the various paths to dynamically select the path to communicate over.

Network Based Network Security Assessment

Figure 3:
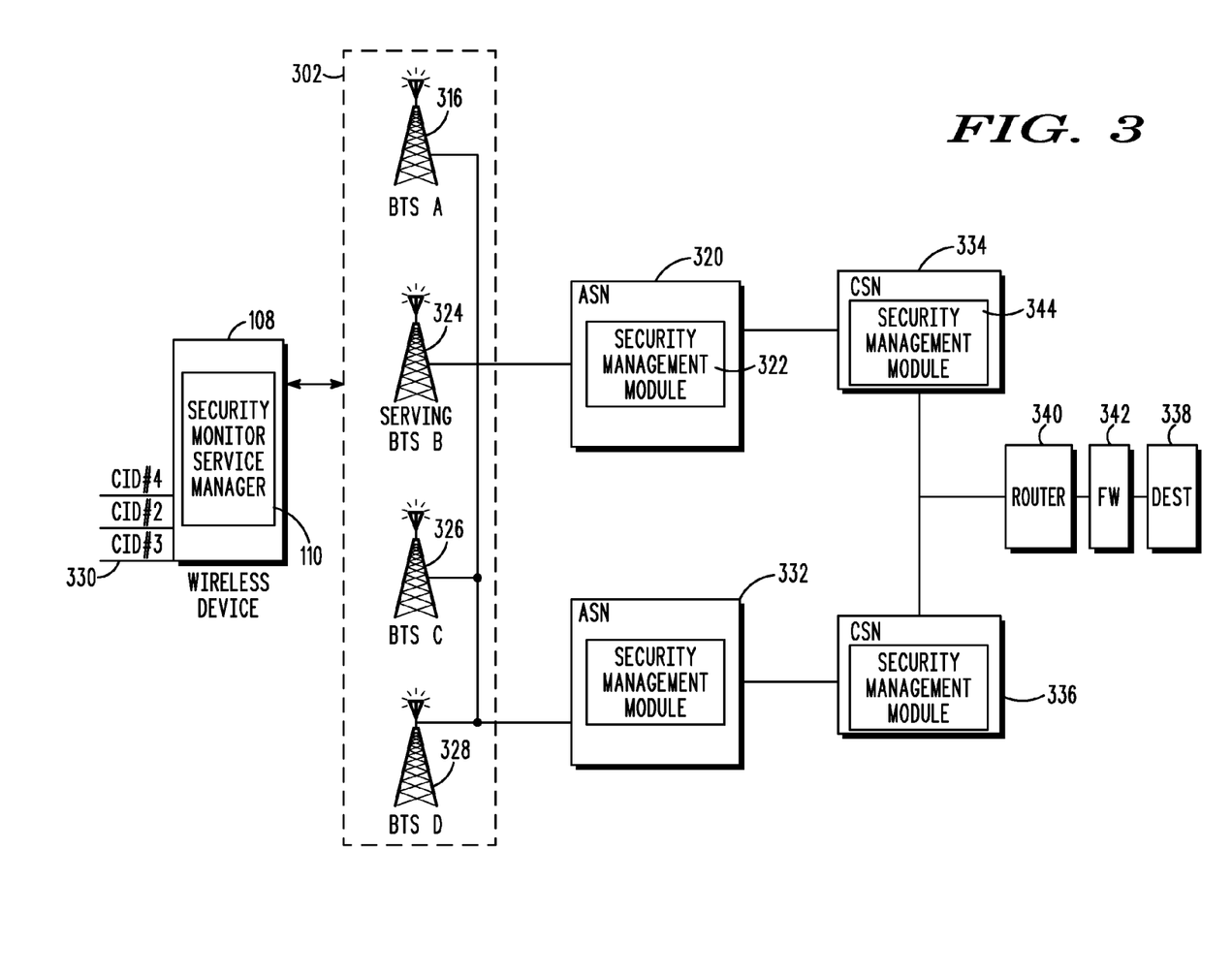
FIG. 3 is a block diagram illustrating a wireless communication system comprising a network component that performs a two-tiered network security assessment process according to an embodiment of the present invention.

FIG. 3 shows another example of a network security assessment method. In particular, FIG. 3 shows wireless communications system 300 where the two-tiered security assessment method discussed above with respect to FIG. 1 is network oriented. In other words, a component on the network side performs the two-tiered security assessment method discussed above.

Similar to the example of FIG. 2, the wireless device 108 in FIG. 3 is active in an access network 302 providing a specific access type such as WiMax. It should be noted that the wireless device 108 is not limited to wireless phone, the wireless device 108 can also be a machine comprising a wireless interface card such as an ATM. It should also be noted that each base station depicted can also represent a network providing a different access type. For example, the wireless device 108 is communicating with base station B (cell B) 324. Each cell 316, 324, 326, 328, in this example, provides a different security level. For example, cell A 316 may provide 64-bit encryption and/or a no encryption states, cell B 324 (the serving cell of the wireless device 108 in this example) may provide free access (no-encryption), cell C 326 may provide 128-bit encryption, and cell D 328 may provide 256-bit encryption.

Although the wireless device 108 is currently communicating over cell B 324 a connection ID 330 that the wireless device 108 wants to use requires a high level of security such as a 256-bit encryption. In one embodiment, the wireless device 108 notifies a network component such as an ASN 320, 332 of its security level requirement. In another embodiment, the wireless device 108 can notify the ASN 320, 332 of a connection ID 330 that is wants to use. The ASN 108 can then determine a security level associated with that particular connection ID 330 for the wireless device 108. In this example, the ASN 320, 332 comprises a database of security related information for each wireless device 108 it communicates with.

In one embodiment, each ASN 320, 332 is operated by a separate network provider or can be operated by the same network provider. Additionally, one or more of the network service providers can be a Mobile Virtual Network Operator ("MVNO") that a wireless device subscribes to. For example, a MVNO can offer a higher security level to its subscribing members. Similar to the example of FIG. 2, each ASN 320, 332 and CSN 334, 336 includes a security management module 322, 344.

However, in the example of FIG. 3, the security management module 322 of an ASN 320, 332 determines the security level provided by each network/cell that the wireless device 108 can communicate with. The ASN 320, 332 can then rank each assessed cell/network based on the provided security level or how closely the provided security level matches the requirements of the wireless device 108. For example, if the wireless device 108 requires 256-bit encryption, the ASN 320, 332 ranks cell D 328 as a top candidate. In one embodiment, the security information including any cell/network rankings can be transmitted to the wireless device. However, the ASN 320, 332 can also notify the wireless device 108 to automatically transition to the cell/network providing the required security. The ASN 320, 332 can also force the hand over as well.

Once the wireless device 108 transitions to the new cell/network (if needed), the ASN 320, 332 performs a second-tier security assessment of the various network paths existing between the device 108 and a final destination 338 similar to the method discussed above with respect to FIG. 2. The security management module 320 of the ASN 320, 332 analyzes all of the security information received from each component on all queried network paths. The security management module 320 of the ASN 320, 332 can then determine whether any network path provides a security level that meets or exceeds the security requirements of the wireless device 108. It should be noted that the wireless device 108 can have a different security requirement for the first-tier (i.e., cells/networks) than for the second-tier (i.e., network paths to the destination 238) of the security assessment process.

If one or more of the network paths can provide the wireless device 108 with the appropriate level of security, the security management module 322 of the ASN 320, 332 selects one of these network paths to for the wireless device to communicate over. The ASN 320, 332 can setup the link for the wireless device 108 or allow the wireless device 108 to setup the link. However, if none of the network paths can provide the wireless device 108 with the appropriate level of security, the ASN 320, 332 can terminate the connection with the current cell/network and removes this cell/network from its list of candidate cell/networks. The ASN 320, 332 then selects another cell/network from candidate cell/network list. It should be noted that the ASN 320, 332 can also notify the wireless device 108 that suitable network paths were found and allow the wireless device 108 to terminate its connection with its current cell/network.

Third-Party Based Network Security Assessment

Figure 4:
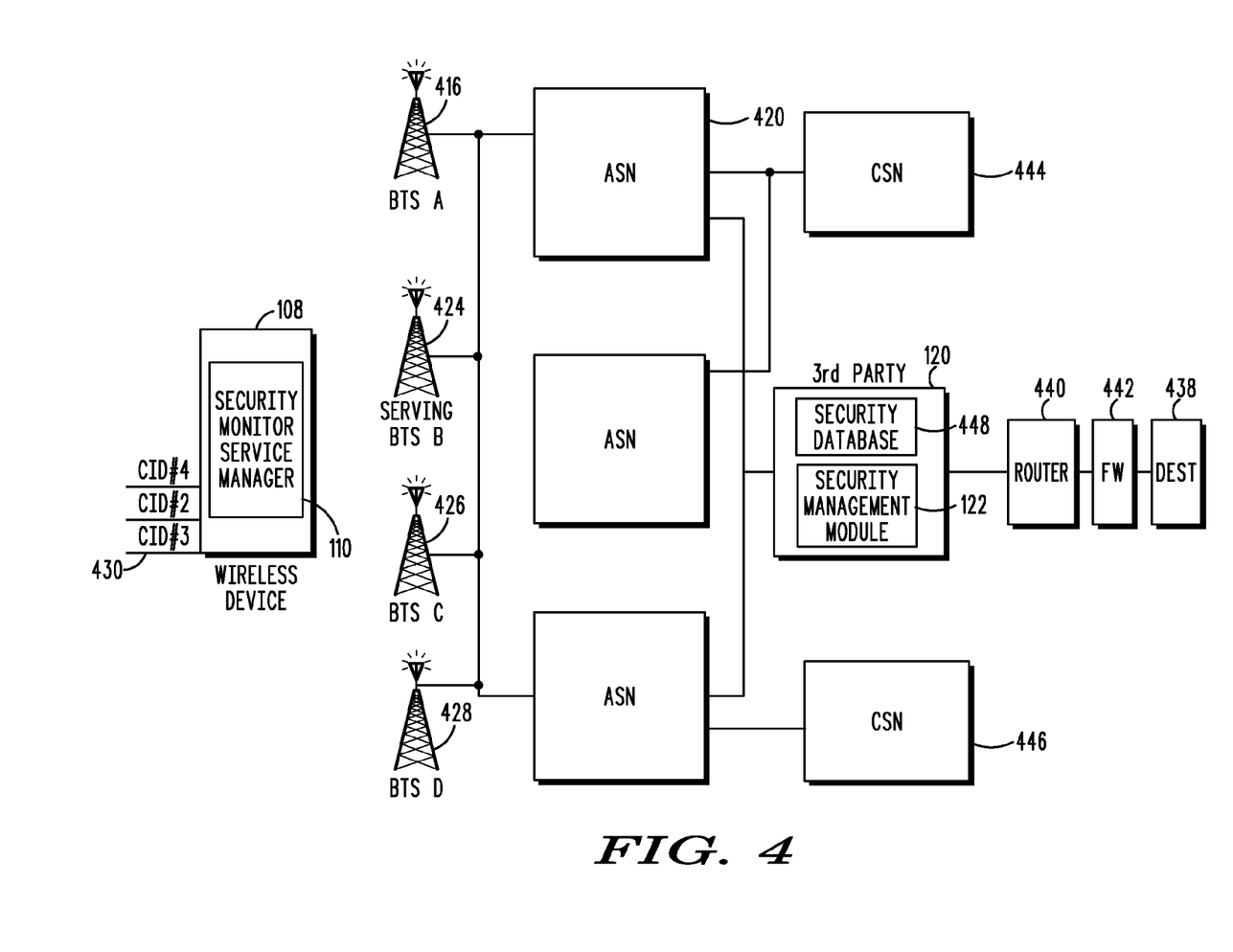
FIG. 4 is a block diagram illustrating a wireless communication system comprising a third-party server that performs a two-tiered network security assessment process according to an embodiment of the present invention.

FIG. 4 shows yet another example of a network/cell security assessment method. In particular, FIG. 4 shows a wireless communications system 400 where the two-tiered security assessment method discussed above with respect to FIG. 2 and FIG. 3 is third-party oriented. In other words, a third-party server 120 performs the two-tiered security assessment method discussed above. Wireless devices 108, in one embodiment, can subscribe to the third-party server 120 for receiving security assessment information. FIG. 4 shows a wireless communication system 400 comprising the wireless device 108 and a plurality of base stations 416, 424, 426, 428. It should be noted that each base station 416, 424, 426, 428 can represent a separate access network, separate cells within the same access network, or a combination of both.

In the example of FIG. 4 example, base station A 416 represents a first access network providing WiMax, base station B 424 represents a second access network providing GPRS, base station C 426 represents a third network providing 802.11, and base station D 228 represents a fourth access network providing EV-DO. In one embodiment, the wireless device 108 sends a request to the third-party server 120 for security information associated with access networks nearby. In another embodiment, the wireless device 108 can send a request to the third-party server 120 for security information associated with access networks providing a particular access type such as WiMax. These requests can be sent to the third-party server 120 prior to the wireless device 108 selecting a serving network or while the wireless device 108 is currently communicating with a serving network.

In one embodiment, the wireless device 108 includes a connection ID 430 for communicating with the third-party server 120. The third-party server 120, in one embodiment, comprises a security database 448 that includes security information associated with various access networks through the wireless communication system 400. The security database 448 can also includes security information for various network components such as ASNs 420, 442, CSNs 444, 446, routers 440, firewalls 442, and the like. This information can be collected by the third party-server 446 in various ways.

For example, the third-party server 120 can periodically query these components via its security management module 122 to retrieve their security information. The third-party server 120 can also query these components in response to a security assessment request received from the wireless device 108. Also, wireless devices 108 can upload security information that they have recorded. It should be noted that the ASN 320, 332 in the FIG. 2 example can communicate with a third-party server 120 to retrieve security information associated with various access networks and network components. In this embodiment, the ASN 320, 332 performs the security assessment based on information received from the third-party server 446.

The information received from the third-party server 120 can either be security information associated with each cell/network or security assessment information. For example, security information can include security levels provided by each of the cells/networks. The wireless device 108, in this embodiment, utilizes the receive security information to rank each cell/network based on the provided security or how close the provided security matches the device's requirements. The wireless device 108 dynamically selects a cell/network to associate with. Alternatively, the third-party server 120 transmits security assessment information comprising security rankings. For example, the third-party sever 446 can rank each cell/network based on the provided security or how close the provided security matches the device's requirements. The wireless device 108, in this embodiment, can then dynamically select a cell/network to dynamically associate with based on the received security assessment information.

As discussed above, the wireless device 108 can subscribe to the third-party server 108 or pay a premium for additional security services. For example, the wireless device 108 can pay a premium for the third-party server 120 to establish a more secured connection on behalf of the wireless device through the network.

Once the wireless device 108 has selected a new cell/network (or has selected its current cell/network), the third-party server 120 can perform a second-tier security assessment via its security management module 122 of the various network paths existing between the device 108 and the final destination 438. For example, the third-party server 120, in one embodiment, interrogates various network components such ASNs 420, 432, CSNs 434, 436, routers 440, firewalls 442, and the like to determine their provided security levels. This security information can be transmitted to the wireless device 108 so that it can determine a suitable network path based on its security requirements.

However, the third-party server 120 can also determine suitable network paths for the wireless device 108 and rank each network path accordingly. The wireless device 108 can then receive the ranking information and select an appropriate network path for communicating with the destination 438. If the selected network path is suitable (i.e., provides the necessary security requirements and the wireless device 108 can successfully communicate over the path) the connection to the destination completes. However, if the selected network path does not provide suitable security levels or the wireless device 108 cannot successfully connect to the destination over the path, the wireless device 108 selects the next network path from the candidate list received from the third-party server. If the wireless device 108 has exhausted the candidate list then it disconnects from the selected cell/network and removes this cell/network from list of candidate cell/networks. The wireless device 108 then selects another cell/network from security level ranking list.

Wireless Communication Device

Figure 5:
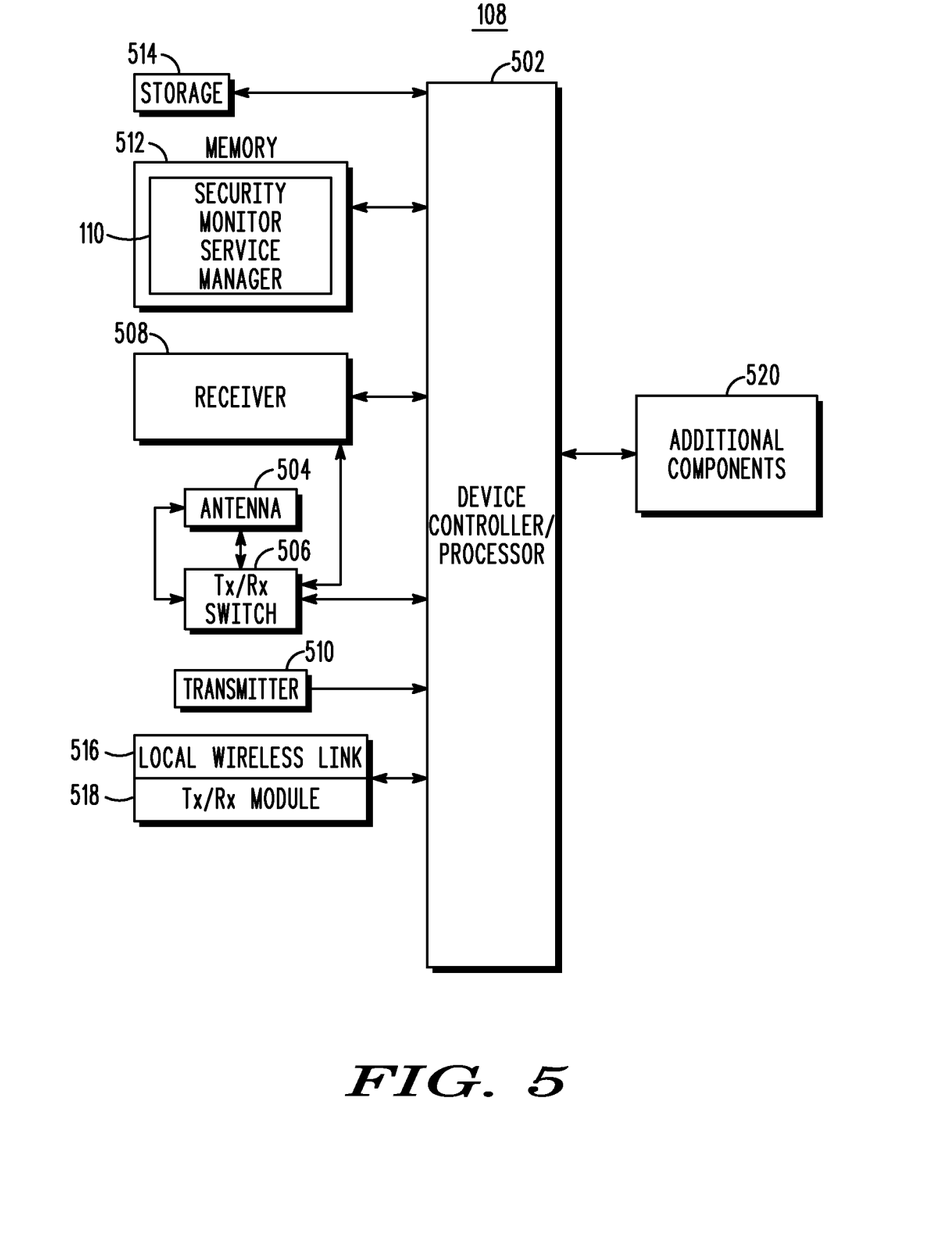
FIG. 5 is a block diagram illustrating a wireless communication device according to an embodiment of the present invention.

FIG. 5 is a block diagram illustrating a detailed view of the wireless device 108 according to an embodiment of the present invention. It is assumed that the reader is familiar with wireless communication devices. To simplify the present description, only that portion of a wireless communication device that is relevant to the present invention is discussed. The wireless device 108 operates under the control of a device controller/processor 502, that controls the sending and receiving of wireless communication signals. In receive mode, the device controller 502 electrically couples an antenna 504 through a transmit/receive switch 506 to a receiver 508. The receiver 508 decodes the received signals and provides those decoded signals to the device controller 502.

In transmit mode, the device controller 502 electrically couples the antenna 504, through the transmit/receive switch 506, to a transmitter 510. It should be noted that in one embodiment, the receiver 508 and the transmitter 510 are a dual mode receiver and a dual mode transmitter for receiving/transmitting over various access networks providing different air interface types. In another embodiment a separate receiver and transmitter is used for each of type of air interface.

The device controller 502 operates the transmitter and receiver according to instructions stored in the memory 512. These instructions include, for example, a neighbor cell measurement-scheduling algorithm. The memory 512, in one embodiment, also includes the security monitor service manager 110, security assessment module 112, and network selector 114, which have been discussed in greater detail above. The wireless device 108, also includes non-volatile storage memory 514 for storing, for example, an application waiting to be executed (not shown) on the wireless device 108. The wireless device 108, in this example, also includes an optional local wireless link 516 that allows the wireless device 108 to directly communicate with another wireless device without using a wireless network. The optional local wireless link 516, for example, is provided by Bluetooth, Infrared Data Access (IrDA) technologies, or the like.

The optional local wireless link 516 also includes a local wireless link transmit/receive module 518 that allows the wireless device 108 to directly communicate with another wireless device such as wireless communication devices communicatively coupled to personal computers, workstations, and the like. It should be noted that the optional local wireless link 516 and the local wireless link transmit/receive module 518 can be used to communicate over various access network as discussed above.

Information Processing System

Figure 6:
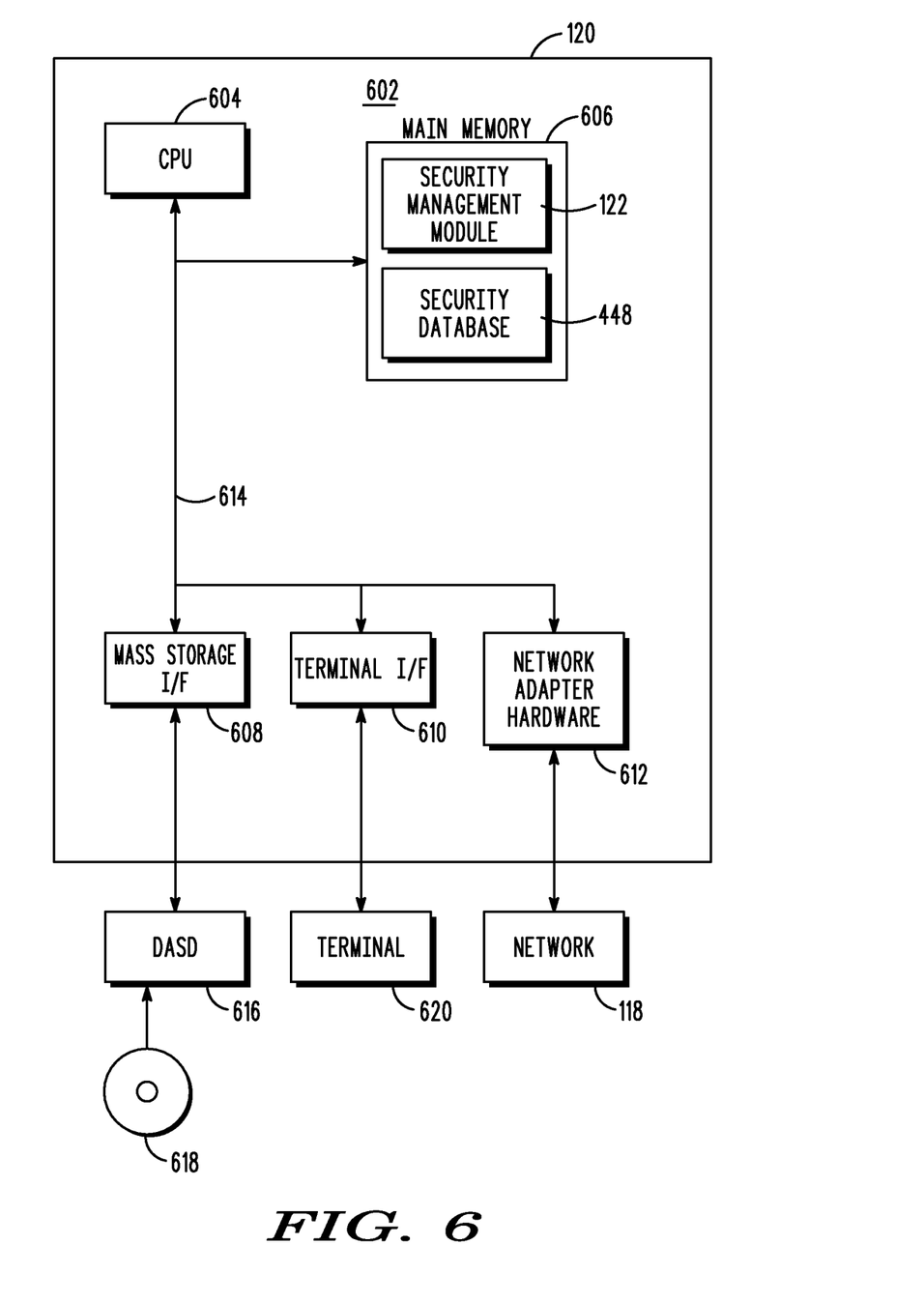
FIG. 6 is a block diagram illustrating an information processing system according to an embodiment of the present invention.

FIG. 6 is a block diagram illustrating a more detailed view of the information processing system according to an embodiment of the present invention. Although the following discussion is with respect to the information processing system 120, which in one embodiment is a third-party server, it is also applicable to any information processing system communicatively coupled to the wireless communication system 100. The information processing system 120 is based upon a suitably configured processing system adapted to implement the embodiment of the present invention. For example, a personal computer, workstation, or the like, may be used. The information processing system 120 includes a computer 602. The computer 602 has a processor 604 that is connected to a main memory 606, a mass storage interface 608, a terminal interface 610, and network adapter hardware 612. A system bus 614 interconnects these system components.

The main memory 606 includes security management module 122 and the security database 448 (if any). These components have been discussed in greater detail above. Although illustrated as concurrently resident in the main memory 606, it is clear that respective components of the main memory 606 are not required to be completely resident in the main memory 606 at all times or even at the same time. One or more of these components can be implemented as hardware. In one embodiment, the information processing system 120 utilizes conventional virtual addressing mechanisms to allow programs to behave as if they have access to a large, single storage entity, referred to herein as a computer system memory, instead of access to multiple, smaller storage entities such as the main memory 606 and data storage device 616. The data storage device 616 can store data on a hard-drive or media such as a CD 616. Note that the term "computer system memory" is used herein to generically refer to the entire virtual memory of the information processing system 108.

Although only one CPU 604 is illustrated for computer 602, computer systems with multiple CPUs can be used equally effectively. Embodiments of the present invention further incorporate interfaces that each includes separate, fully programmed microprocessors that are used to off-load processing from the CPU 604. Terminal interface 610 is used to directly connect one or more terminals 620 to computer 602 to provide a user interface to the information processing system 120. These terminals 620, which are able to be non-intelligent or fully programmable workstations, are used to allow system administrators and users to communicate with the information processing system 108. The terminal 620 is also able to consist of user interface and peripheral devices that are connected to computer 602 and controlled by terminal interface hardware included in the terminal I/F 610 that includes video adapters and interfaces for keyboards, pointing devices, and the like.

An operating system (not shown) included in the main memory is a suitable multitasking operating system such as Linux, UNIX, Windows XP, and Windows Server 2003. Embodiments of the present invention are able to use any other suitable operating system. Some embodiments of the present invention utilize architectures, such as an object oriented framework mechanism, for executing instructions of the components of operating system (not shown) on any processor located within the information processing system 108.

The network adapter hardware 612 is used to provide an interface to the public network 118 and/or any of the access networks 102, 104, 106. Embodiments of the present invention are able to be adapted to work with any data communications connections including present day analog and/or digital techniques or via a future networking mechanism. Although the embodiments of the present invention are described in the context of a fully functional computer system, those of ordinary skill in the art will appreciate that embodiments are capable of being distributed as a program product via floppy disk, e.g., CD/DVD 618, or other form of recordable media, or via any type of electronic transmission mechanism.

Process of Network Selection Based Upon a Two-Tiered Security Assessment

Figure 7:
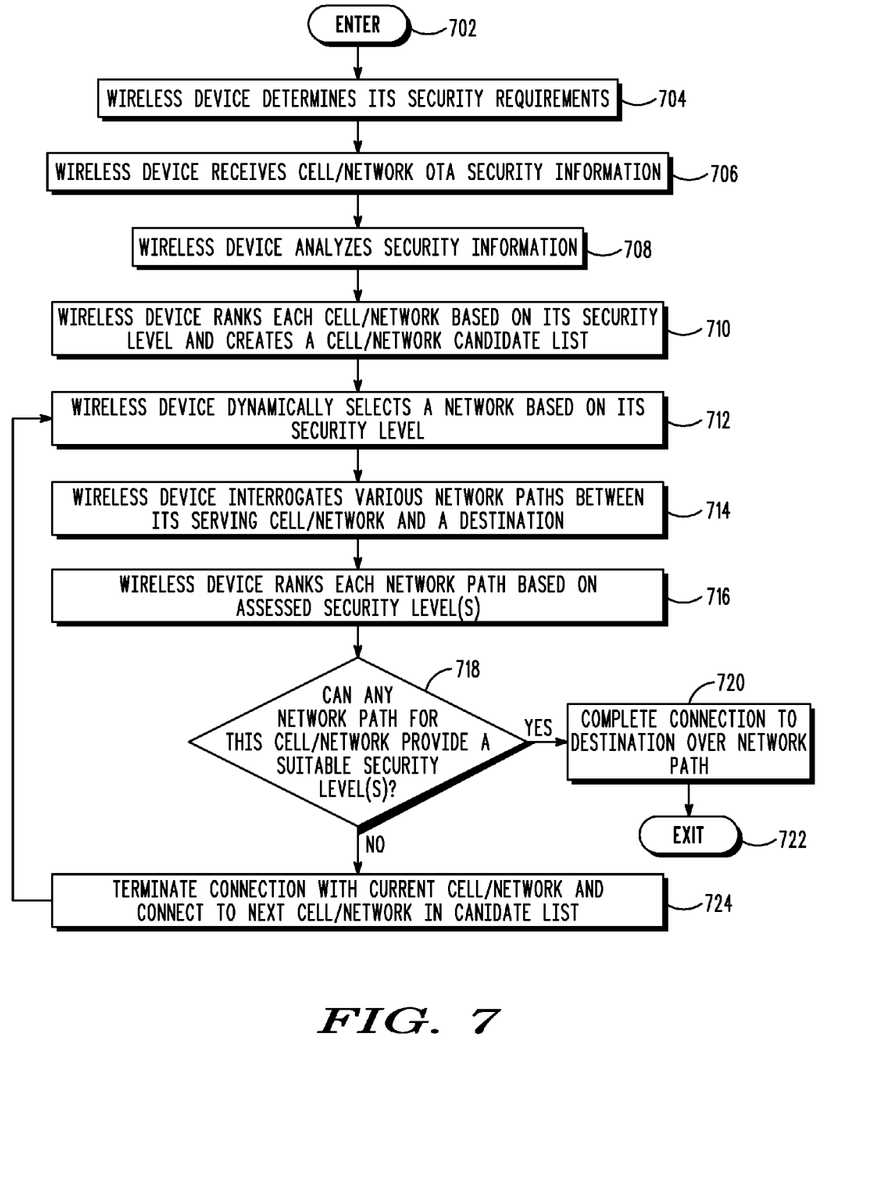
FIG. 7 is an operational flow diagram illustrating a process of a wireless device performing a two-tiered network security assessment process according to an embodiment of the present invention.

FIG. 7 is an operational flow diagram illustrating a process of the wireless device 108 dynamically selecting a network and a network path for communicating data to a destination based on a security assessment of each. The operational flow diagram of FIG. 7 begins at step 702 and flows directly to step 704. The wireless device 108, at step 704, determines security requirements for a service or action to be used or performed. Security information 232, at step 706, is received from each nearby cell/network. The wireless device 108, at step 708, analyzes the security information 232. Each cell/network, at step 710, is ranked based on its provided security level or how closely the provided security matches the device's current requirements. The wireless device 108 can create a candidate cell/network list.

The wireless device 108, at step 712, dynamically selects a network based on its assessed security level. For example, the wireless device 108 can select the highest ranked cell/network from a candidate list. Once the wireless device 108 is connects to the cell/network, the wireless device 108, at step 714, interrogates various network paths (e.g. subsequent network connections) between its current serving cell/network and a destination 238. The wireless device 108, at step 716, ranks each network path based on security levels assessed during the interrogation. The wireless device 108, at step 718, determines if any of the network paths can provide a suitable security level. If the result of this determination is positive, the wireless device 108, at step 720, completes its connection with the destination 238 using a selected network path. The control flow then exits at step 722. If the result of the determination is negative, the wireless device 108, at step 724, terminates its connection with its current cell/network and associated with another cell/network in the candidate cell/network list. The control flow returns to step 712.

Figure 8:
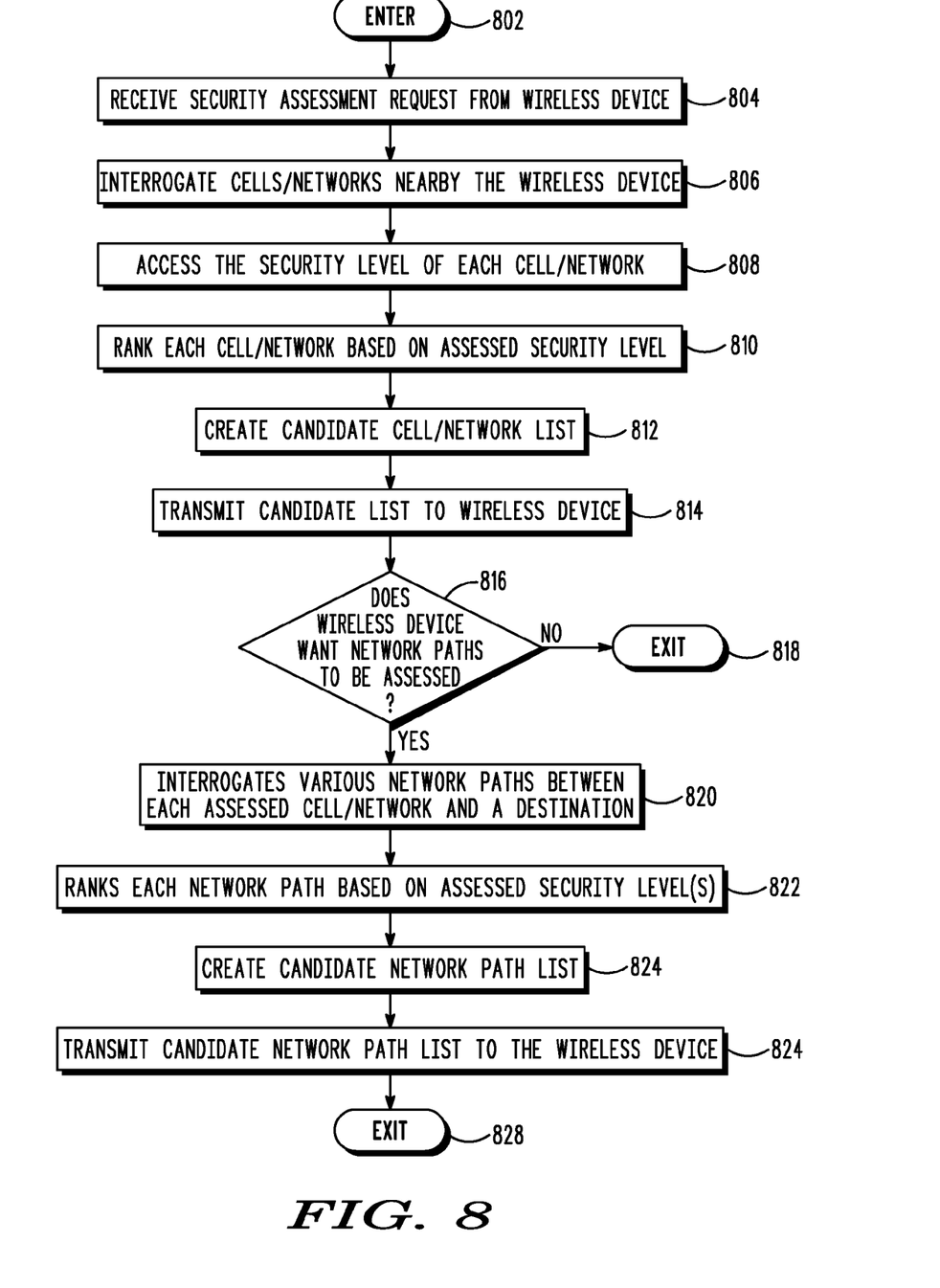
FIG. 8 is an operational flow diagram illustrating a process of an information processing system performing a two-tiered network security assessment process according to an embodiment of the present invention.

Another Process of Network Selection Based Upon a Two-Tiered Security Assessment FIG. 8 is an operational flow diagram illustrating a process of the third-party server 120 performing a two-tiered network security assessment on behalf of the wireless device. The third-party server 120, at step 804, receives a security assessment request from a wireless device 108. The third-party server 120, at step 806, interrogates cells/networks nearby the wireless device 108. The security level(s) of each cell/network, at step 808, are assessed. The third-party server 120, at step 810, ranks each cell/network based on the security level provided or how closely the security level matches a security requirement(s) of the wireless device 108. The third-party server 120, at step 814, creates a candidate cell/network list and transmits the list to the wireless device 108 at step 816. Alternatively, the assessed security information can be passed along to the wireless device so that it can rank the cells/networks itself.

In another embodiment, the third-party server 120 can include a security database 448 that is populated by wireless devices 108. For example, wireless devices 108 can transmit security information associated with detected cells/networks. The third-party server 120 can act as a repository for this information. When a wireless device 108 requests security information for its location, specific cells/networks, or the like, the third-party server 120 can query its database 448 and transmit the appropriate security information (e.g., security levels, security rankings, candidate cell/network list, and the like) to the wireless device 108.

The wireless device 108, at step 816, determines if the wireless device 108 wants network paths to also be assessed. For example, the wireless device 108 can assess the security levels of network paths itself (as discussed above) or have the third-party server do so. If the result of this determination is negative, the control flow exits at step 818. If the result of this determination is positive, the third-party server 120, at step 820, interrogates various network paths between the current serving cell/network of the device 108 and a destination 238. The third-party server 120, at step 822, ranks each network path based on security levels assessed during the interrogation. The third-party server 120, at step 824, creates a candidate network path list and transmits the list, at step 826, to the wireless device 108. The control flow then exits at step 828.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of selecting a set of secure network connections between a wireless device in a wireless communication system and a target destination system, the method comprising:

determining a security level requirement for a wireless device;

performing a first security assessment for each of a plurality of base stations available for wireless communications with the wireless device, wherein each base station has an associated security level, wherein the first security assessment provides results of how close the security level of each base station matches the security level requirement for the wireless device, wherein one of the base stations in the plurality is selected based on the results of the first security assessment;

performing a second security assessment for each of a plurality of network paths from the wireless device to a target destination system via the selected base station, wherein each network path has an associated security level that is determined based on security information for at least one network component included in the network path, wherein the second security assessment provides results of whether any of the network paths has a security level that meets the security level requirement for the wireless device and is, thereby, selectable to enable communications between the wireless device and the target destination system.

2. The method of claim 1:

wherein the first security assessment is performed with at least one of: a wireless device, at least one of the plurality of base stations, an internal information processing system operated by a service provider of the wireless communication system, and an external information processing system operated by a third party service provider; and wherein the second security assessment is performed with at least one of: the wireless device, at least one of the plurality of base stations, an internal information processing system operated by a service provider of the wireless communication system, and an external information processing system operated by a third party service provider.

3. The method of claim 1, further comprising:

determining, in response to performing the second security assessment, that the security level of each network path fails to meet the security level requirement for the wireless device, wherein a second one of the base stations in the plurality is selected based on the results of the first security assessment; and performing a subsequent second security assessment for each of a plurality of network paths from the wireless device to the target destination system via the selected second base station, wherein each network path has an associated security level that is determined based on security information for at least one network component included in the network path, wherein the subsequent second security assessment provides results of whether any of the network paths has a security level that meets the security level requirement for the wireless device and is, thereby, selectable to enable communications between the wireless device and the target destination system.

4. The method of claim 1, further comprising:

selecting, based on the results of the security assessment, a network path of the plurality of network paths, which has a security level that meets the security level requirement for the wireless device; and communicating with the target destination system via the selected base station and the selected network path.

5. The method of claim 1, further comprising:

receiving a respective over-the-air message from each base station in the plurality of base stations, the respective over-the-air message comprising security information associated with each base station that is used to determine the associated security level for each base station.

6. The method of claim 1, wherein performing the first security assessment further comprises:

associating a priority level with each base station in the plurality of base stations based on the associated security level of each base station in order to prioritize the plurality of base stations based on how close the security level of each base station matches the security level requirement for the wireless device; and selecting the base station based on the priority level.

7. The method of claim 1, wherein performing the second security assessment further comprises:

connecting with the selected base station; and associating a priority level with each network path in the plurality of network paths in order to prioritize the network connections based on whether any of the network paths has a security level that meets the security level requirement for the wireless device.

8. The method of claim 1 further comprising:
transmitting a request to an information processing system for security information associated with the plurality of base stations to determine the security level of each base station, wherein the information processing system is one of: an internal information processing system operated by a service provider of the wireless communication system or an external information processing system operated by a third party service provider; and
receiving the security information from the information processing system, wherein the security information comprises at least one of: the security levels associated with each base station in the plurality of base stations, a candidate list comprising priority levels associated with the plurality of base stations, the security levels associated with each network path in the plurality of network paths, or a candidate list comprising priority levels associated with the plurality of network paths.

9. The method of claim 1 further comprising:
receiving a request from the wireless device for security information associated with at least one of the plurality of base stations or the plurality of network paths between the selected and the target destination system, wherein the first and second security assessments are performed in response to receiving the request.

10. The method of claim 9, further comprising:
transmitting, to the wireless device, at least one of a prioritized list of base stations or a prioritized list of network paths, wherein each prioritized list is based at least in part on the security level associated with each base station and the security level associated with each network path.

11. A wireless device comprising:
a memory;
a processor communicatively coupled to the memory;
a transceiver communicatively coupled to the memory and the processor; and
a security monitor service manager, communicatively coupled to the memory, the processor, and the transceiver, wherein the security monitor service manager is adapted to:
determine a security level requirement for a wireless device
perform a first security assessment for each of a plurality of base stations available for wireless communications with the wireless device, wherein each base station has an associated security level, wherein the first security assessment provides results of how close the security level of each base station matches the security level requirement for the wireless device, wherein one of the base stations in the plurality is selected based on the results of the first security assessment;
perform a second security assessment for each of a plurality of network paths from the wireless device to a target destination system via the selected base station, wherein each network path has an associated security level that is determined based on security information for at least one network component included in the network path, wherein the second security assessment provides results of whether any of the network paths has a security level that meets the security level requirement for the wireless device and is, thereby, selectable to enable communications between the wireless device and the target destination system.

12. The wireless device of claim 11 wherein the first security assessment is performed by one of: the wireless device, at least one of the base stations in the plurality of base stations, an internal information processing system operated by a service provider of a wireless communication system, and an external information processing system operated by a third party service provider.

13. The wireless device of claim 12, wherein performing the first security assessment further comprises:
associating, in response to performing the first security assessment, a priority level with each base station based on the security level of each base station, wherein the base station is selected from the plurality of base stations based on the priority level associated with each base station.

14. The wireless device of claim 11, wherein the security monitor service manager with the transceiver establishes communication with the target destination system via the selected base station through a selected network path.

15. The wireless device of claim 11 wherein the security monitors service manager is further adapted to:
transmit a request to an information processing system for security information associated with the plurality of base stations; and
receive the security information from the information processing system, wherein the security information comprises at least one of: the security level associated with each base station in the plurality of base stations, a candidate list comprising priority levels associated with the plurality of base stations, the security level associated with each network path in the plurality of network paths, or a candidate list comprising priority levels associated with the plurality of network paths.

16. The wireless device of claim 11 wherein the security monitors service manager is further adapted to:
determine, in response to performing the second security assessment, that the security level of each network path fails to meet the security level requirement for the wireless device, wherein a second one of the base stations in the plurality is selected based on the results of the first security assessment; and
perform a subsequent second security assessment for each of a plurality of network paths from the wireless device to the target destination system via the selected second base station, wherein each network path has an associated security level that is determined based on security information for at least one network component included in the network path, wherein the subsequent second security assessment provides results of whether any of the network paths has a security level that meets the security level requirement for the wireless device and is, thereby, selectable to enable communications between the wireless device and the target destination system.

17. The wireless device of claim 11 wherein the second security assessment is performed by one of: the wireless device, at least one of the base stations in the plurality of base stations, an internal information processing system operated by a service provider of a wireless communication system, and an external information processing system operated by a third party service provider.

18. The wireless device of claim 11, wherein performing the second security assessment further comprises:
associating a priority level with each network path in the plurality of network paths based on the security level of each network path; and selecting a network path from the plurality of network paths based on the priority level associated with each network path.

\* \* \* \* \*